(12) United States Patent
Aghili et al.

(10) Patent No.: US 11,220,204 B2
(45) Date of Patent: Jan. 11, 2022

(54) TRUCK BED WITH SELECTIVELY ACTUATED MAGNETIC FLOOR SECTIONS

(71) Applicant: FORD GLOBAL TECHNOLOGIES, LLC, Dearborn, MI (US)

(72) Inventors: Mohammad R. Aghili, Dearborn, MI (US); Kevin Lucka, Southfield, MI (US); Aed M. Dudar, Canton, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 16/684,822

(22) Filed: Nov. 15, 2019

(65) Prior Publication Data

US 2020/0079270 A1 Mar. 12, 2020

Related U.S. Application Data

(62) Division of application No. 15/842,392, filed on Dec. 14, 2017, now Pat. No. 10,507,756, which is a division of application No. 15/175,333, filed on Jun. 7, 2016, now Pat. No. 9,868,382.

(51) Int. Cl.
| | | |
|---|---|---|
| *B60P 7/08* | (2006.01) |
| *B60R 9/00* | (2006.01) |
| *B60R 11/06* | (2006.01) |
| *H01F 7/02* | (2006.01) |
| *H02K 7/14* | (2006.01) |
| *B60R 11/00* | (2006.01) |

(52) U.S. Cl.
CPC .................... *B60P 7/08* (2013.01); *B60R 9/00* (2013.01); *B60R 11/06* (2013.01); *H01F 7/0252* (2013.01); *H02K 7/14* (2013.01); *B60R 2011/007* (2013.01); *B60R 2011/0029* (2013.01); *B60R 2011/0085* (2013.01)

(58) Field of Classification Search
CPC .. B60P 7/08; B60P 7/0884; B60P 7/10; B60P 7/0807; B60R 9/00; B60R 11/06; B60R 2011/0029; B60R 2011/007; B60R 9/06; B60R 2011/0085; B60R 2011/0057; B60R 2011/0092; H01F 7/0252
USPC .................................. 410/2, 77, 78, 80, 156
See application file for complete search history.

(56) References Cited

U.S. PATENT DOCUMENTS

| | | | |
|---|---|---|---|
| 5,800,106 A | 9/1998 | Miller | |
| 6,176,657 B1 | 1/2001 | Romph | |
| 8,172,309 B1 | 5/2012 | Weir | |
| 9,221,381 B1 | 12/2015 | Flud | |
| 9,821,728 B2 | 11/2017 | Blaser et al. | |
| 9,868,382 B2 * | 1/2018 | Aghili | B60P 7/08 |
| 10,507,756 B2 * | 12/2019 | Aghili | B60P 7/08 |

(Continued)

*Primary Examiner* — Stephen T Gordon
(74) *Attorney, Agent, or Firm* — David L. Coppiellie; Brooks Kushman P.C.

(57) ABSTRACT

A pick-up truck bed having controllably magnetized areas for retaining cargo or attachment devices. A first permanent magnet may be attached below the lower surface of the truck bed with a second permanent being rotatable relative to the first permanent magnet to control the magnetic flux provided to retain objects in the truck bed. Alternatively, one or more electromagnets may be provided that may be turned on to retain objects in the truck bed and turned off to allow removal of objects.

5 Claims, 5 Drawing Sheets

(56) References Cited

U.S. PATENT DOCUMENTS

| | | |
|---|---|---|
| 2002/0038962 A1 | 4/2002 | Perez |
| 2005/0286986 A1* | 12/2005 | Thomson .................. B60P 7/15 |
| | | 410/117 |
| 2006/0177282 A1* | 8/2006 | Blosser ................ B60P 7/0823 |
| | | 410/106 |
| 2009/0041557 A1* | 2/2009 | Lin ...................... B60P 7/0823 |
| | | 410/97 |
| 2012/0292359 A1 | 11/2012 | O'Dell |
| 2013/0076059 A1 | 3/2013 | Zalan et al. |

\* cited by examiner

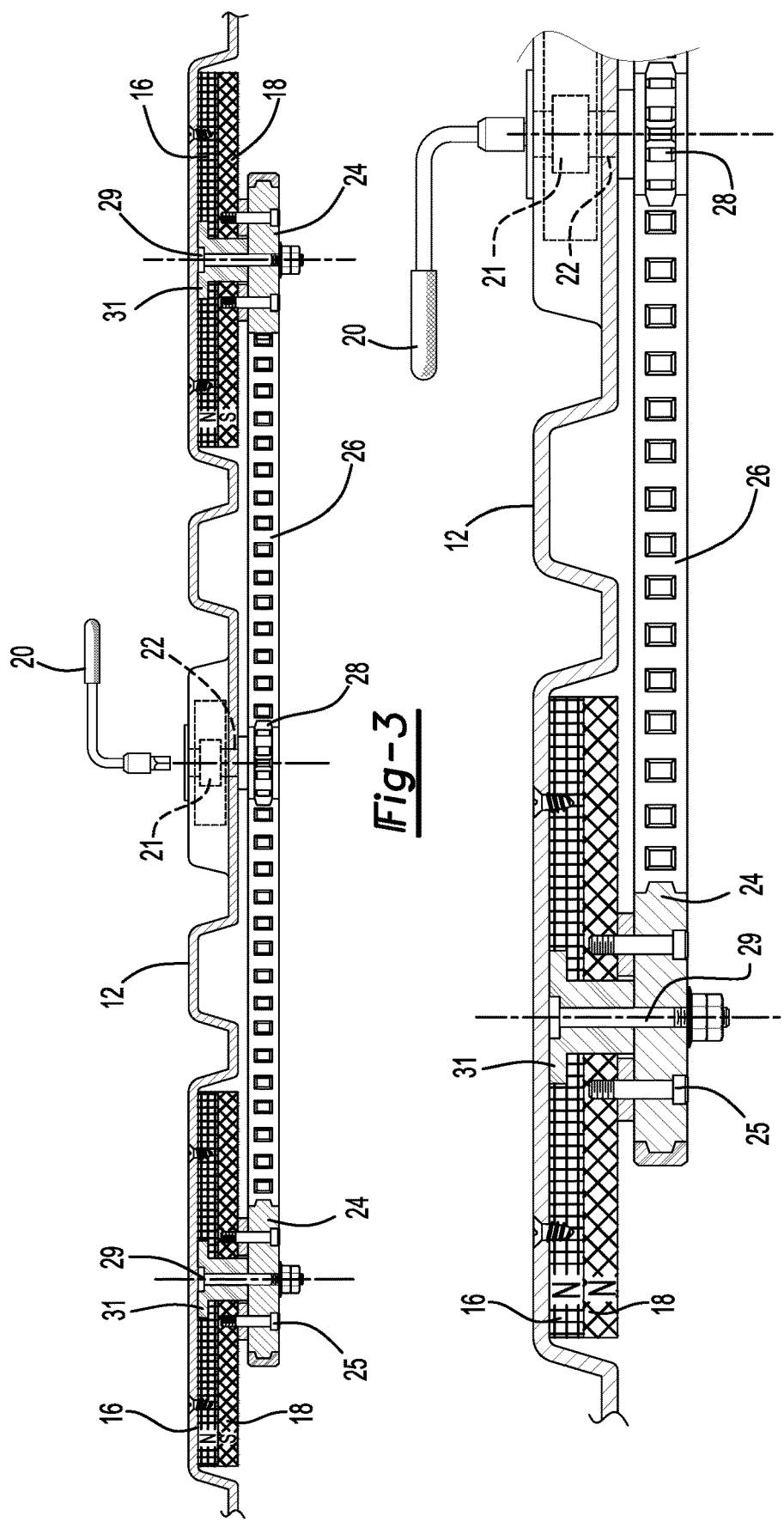

TRUCK BED WITH SELECTIVELY ACTUATED MAGNETIC FLOOR SECTIONS

REFERENCE TO RELATED APPLICATIONS

This application is a division of U.S. application Ser. No. 15/842,392 filed Dec. 14, 2017 now U.S. Pat. No. 10,507,756 issued Dec. 17, 2019, which is a division of U.S. application Ser. No. 15/175,333 filed Jun. 7, 2016, now U.S. Pat. No. 9,868,382 issued Jan. 16, 2018, the disclosures of which are hereby incorporated in their entirety by reference herein.

TECHNICAL FIELD

This disclosure relates to a pick-up truck bed that includes areas that magnetically hold objects in the truck bed.

BACKGROUND

Pick-up trucks have truck beds that are used to transport a wide variety of objects. Pick-up truck beds normally provide an undivided area that receives objects that may be tied down with ropes, bungee cords, and the like. Tying down objects is time consuming and, if the objects are not properly secured, they may become unsecured during transit, loading or unloading.

Attaching magnets to objects to be stored in or on a truck or other vehicle is proposed in US 2012/292359. A permanent magnet is proposed to be attached to a container or truck bed divider to hold the object in place during transit. The publication also discloses the concept of providing a magnet embedded in the truck box floor or in a bed liner. One problem with this approach is that the magnetic force holding the object in place also resists unloading objects from the truck bed so the degree of magnetic force provided must be limited to allow unloading. Limiting the magnetic force holding the object increases the risk that the object may become dislodged during transit or in a collision.

U.S. Pat. No. 8,172,309 discloses a magnetic bar attached to the rear edge of a truck bed for preventing metal objects such as nails or screws from falling off the back of the truck bed. The magnetic bar attached to the rear edge of the truck bed as disclosed is not intended to secure objects to be transported but is intended to prevent nails or screws from falling off the truck bed. The magnetic force of the permanent magnet is constant and no mechanism is disclosed for changing the magnetic force applied by the magnet.

This disclosure is directed to solving the above problems and other problems as summarized below.

SUMMARY

According to one aspect of this disclosure, a magnetic cargo retainer is disclosed for a pick-up truck bed. The cargo retainer includes a first permanent magnet that creates a first magnetic field applied to objects disposed in the bed. A second permanent magnet creates a second magnetic field. The second permanent magnet is attached to the bed to move relative to the first permanent magnet to change a level of magnetic force applied to objects in the bed.

According to other aspects of this disclosure relating to the cargo retainer, the first permanent magnet may be fixed to the bed and the second permanent magnet may be attached to a pin that extends through an opening defined by the first permanent magnet. The second permanent magnet is rotatable relative to the first permanent magnet.

The first and second permanent magnets each have a north pole and a south pole, the second permanent magnet being rotatable from a retention position with the north pole of the second magnet aligned with the north pole of the first magnet to a release position with the north pole of the second magnet aligned with the south pole of the first magnet.

The cargo retainer may further comprise a handle operatively attached to the second permanent magnet and extending through an opening in the truck bed. The handle is accessible inside the truck bed to rotate the second permanent magnet.

The cargo retainer may further comprise a servo motor operatively attached to the second permanent magnet, wherein the motor may be selectively actuated to rotate or pivot the second permanent magnet.

According to another aspect of this disclosure, a cargo retaining system is disclosed for a pick-up truck bed. The cargo retaining system includes a first plurality of stationary magnets creating a first plurality of magnetic fields that are applied to objects disposed in the bed. A second plurality of rotatable magnets creates a second plurality of magnetic fields and are attached to the bed to move relative to the first plurality of stationary magnets. The second plurality of rotatable magnets is rotated to change a level of magnetic force applied to objects in the bed. A plurality of driven wheels may be attached to each one of the rotatable magnets. A continuous flexible drive element is wrapped around each of the driven wheels to rotate the rotatable magnets. A drive apparatus is disclosed that includes a driving wheel that is rotated to move the flexible drive element and rotate the rotatable magnets.

According to other aspects of the cargo retaining system, the driven wheels may be sprockets and the drive element may be a belt. Alternatively, the drive apparatus may be a servo motor. In another alternative, the drive apparatus may be a handle operatively attached to the drive apparatus that extends through an opening in the truck bed that is accessible inside the truck bed to rotate the drive apparatus.

According to a further aspect of this disclosure, an electromagnetic cargo retainer is disclosed for a pick-up truck bed. The cargo retainer includes an electromagnet attached to the pick-up truck bed and a power source. A switch electrically connects the electromagnet and the power source to turn the electromagnet on to provide magnetic flux inside the truck bed for retaining a magnetically attracted object in the truck bed and off to reduce the magnetic flux provided by the electromagnet inside the truck bed.

The electromagnet may be one of a plurality of electromagnets attached to the pick-up ruck bed and the switch may be electrically connected to each of the plurality of electromagnets to independently turn the electromagnets on and off.

The magnetically attracted object may be a partition secured to the truck bed by the electromagnet.

According to another aspect of this disclosure, a pick-up truck is disclosed that includes a truck bed and a magnet attached to a lower surface of the truck bed. The pick-up truck also includes means for changing the magnetic force applied by the magnet to objects disposed in the truck bed that are attracted to the magnet.

The magnet may be an electromagnet. Alternatively, the magnet may be a first permanent magnet, and the means for changing the magnetic force applied may be a second permanent magnet that may be rotatable to modify the level of magnetic force applied to objects in the truck bed.

The above aspects of this disclosure and other aspects will be described below with reference to the attached drawings.

BRIEF DESCRIPTION OF THE DRAWINGS

FIG. 3 is a cross-sectional view taken along the line 3-3 in FIG. 2.

FIG. 4 is a fragmentary cross-sectional view slightly enlarged showing part of the cargo retention system shown in FIG. 3.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
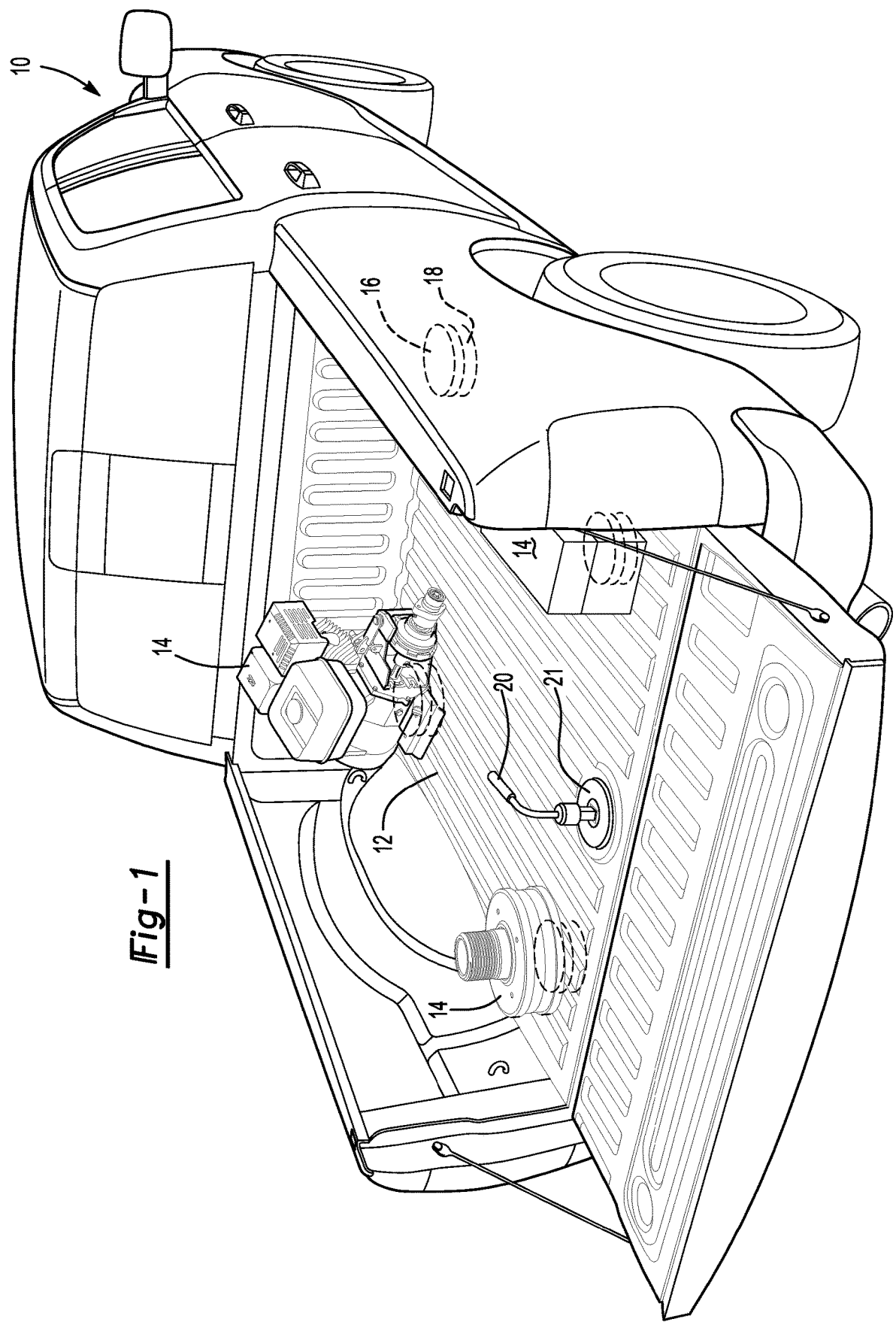
FIG. 1 is a right rear perspective view of a pick-up truck made according to one embodiment of this disclosure.

Referring to FIG. 1, a pick-up truck 10 is illustrated that includes truck bed 12. Several objects 14 are shown disposed in the truck bed 12. The objects 14 are ferrous objects or objects that are subject to magnetic attraction or magnetic forces. A first permanent magnet 16, or stationary magnet, and a second permanent magnet 18, or rotatable magnet, are provided below the truck bed 12. The permanent magnets ay be "rare earth" or neodymium magnets, but could also be another type of permanent magnet. The first and second permanent magnets 16 and 18 as shown are arranged as a cargo retainer or cargo retention system. A removable handle 20 is shown inserted into the truck bed 12 that is used to rotate or pivot the second permanent magnets 18 from 0° to 180° to increase or decrease the magnetic force applied by the magnets 16, 18 to objects 14 disposed in the truck bed 12. The handle 20 is inserted into a handle mounting assembly 21 to adjust the magnetic force applied to an object 14. The permanent magnets 16, 18 do not require power after being set in position and provide a magnetic retention force even when the vehicle power supply is off.

Figure 2:
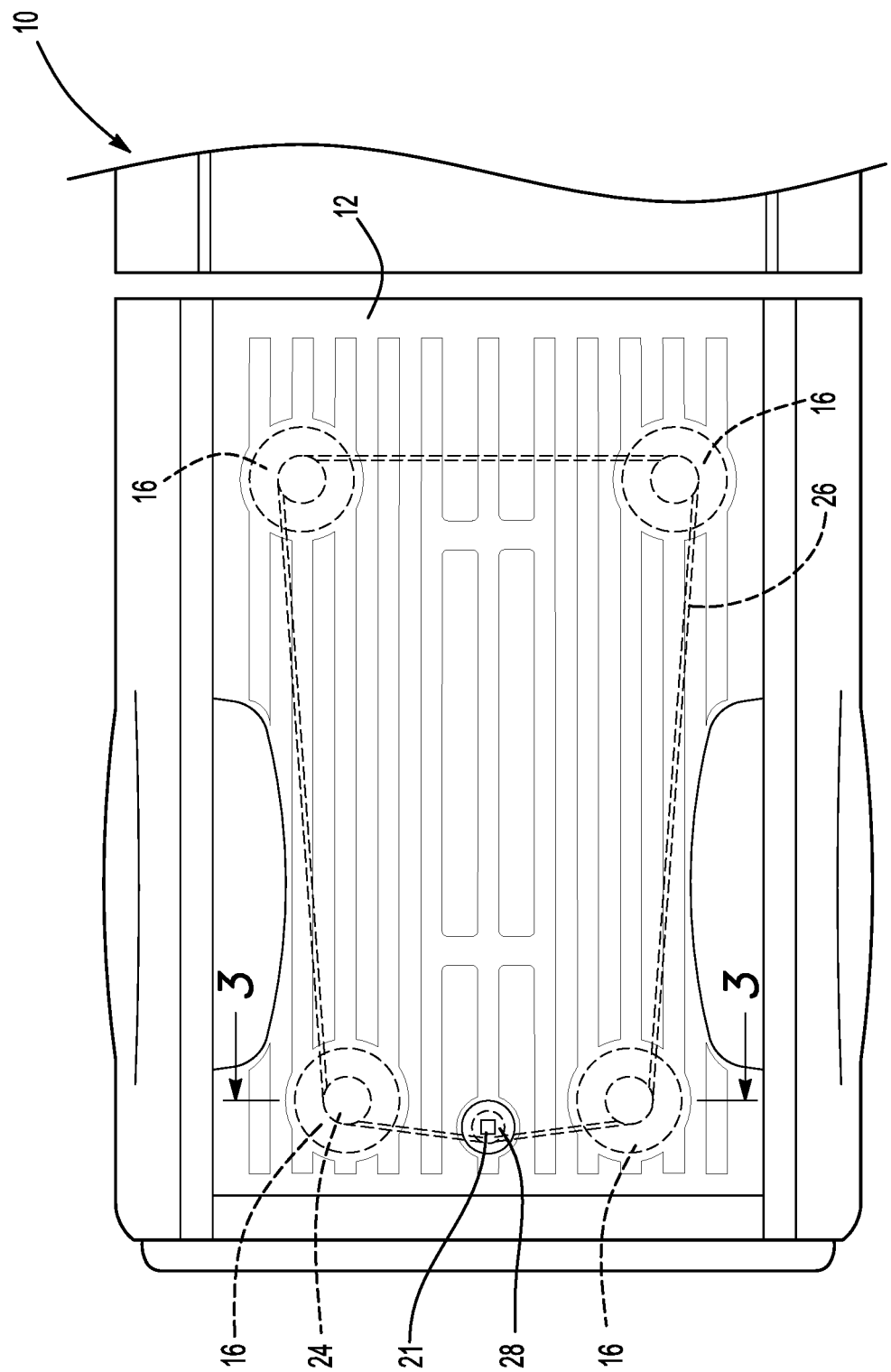
FIG. 2 is a fragmentary top plan view of a pick-up truck bed provided with a cargo retention system in accordance with the embodiment of FIG. 1.

Referring to FIG. 2, one embodiment of a pick-up truck 10 having a bed 12 is illustrated that includes the first permanent magnet 16 and the second permanent magnet 18 (shown in FIGS. 3 and 4). The handle 20 (shown in FIG. 1) is inserted into a handle mounting assembly 21, or bearing, to rotate a driving wheel 28, or a sprocket. The driving wheel 28 engages and rotates the continuous flexible drive element 26, such as a belt or chain. Rotation of the belt 26 causes the driven wheels 24, or sprockets, to rotate and change the position of the second permanent magnet 18 relative to the first permanent magnet 16. The first and second permanent magnets 16, 18 are part of the cargo retention system.

Referring to FIGS. 3 and 4, the truck bed 12 is shown in cross section taken through the handle mounting assembly 20 and two of the first and second permanent magnet assemblies 16 and 18. The first permanent magnet 16 (as shown in FIG. 3) has a north pole that is to the left side of the pin 29. The second permanent magnet 18 has a south pole to the left side of the pin 29. Pin 29 extends through the driven wheels 24 and is received in a bushing 31. The bushing 31 is connected to the first magnet 16 and extends through the second magnet 18. The driven wheels 24 are connected by fasteners 25 to the second magnet 18.

In the release position shown in FIG. 3, the north pole of the permanent or stationary magnet 16 is in alignment with the south pole of the second permanent magnet 18 that is also referred to as a rotatable magnet 18. In this orientation, the magnetic flux provided above the truck bed 12 is reduced due to the attraction of the first permanent magnet 16 to the second permanent magnet 18.

Referring to FIG. 4, the first permanent magnet 16 and the second permanent magnet 18 have north poles that are aligned. In the retention position, a greater amount of flux is directed through the truck bed 12 and the ability of the cargo retainer system to retain objects in the truck bed 12 is enhanced. The truck bed 12 is preferably an aluminum truck bed, or could possibly be a composite truck bed. With either an aluminum or composite truck bed, magnetic flux penetrates the truck bed 12 to a greater extent than would be expected with a steel truck bed.

Referring to FIGS. 3 and 4, the handle 20 is inserted through an opening 22 formed in the truck bed 12. The handle 20 is received in the bearing 21, or handle mounting assembly, and may be used to rotate the driving wheel 28. Rotation of the driving wheel 28 causes the flexible drive element 26 to rotate the driven wheels 24.

The driven wheels 24 are connected to the second permanent magnet 18 and are effective to rotate the second permanent magnets 18 relative to the first permanent magnets 16.

Figure 5:
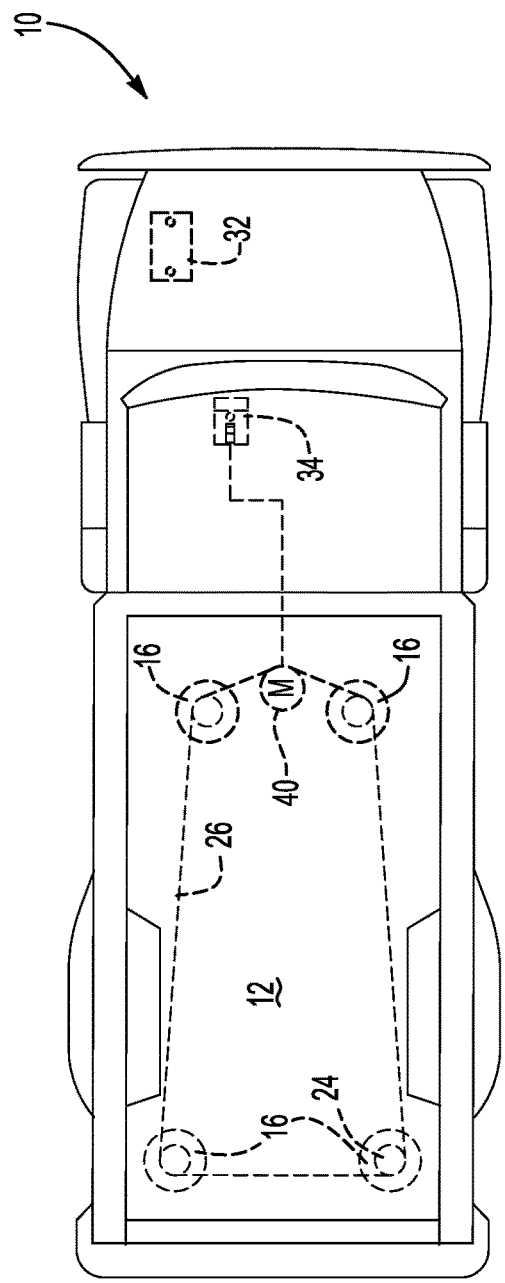
FIG. 5 is a top plan view of a pick-up truck including a truck bed having a motor driven cargo retention system.
Figure 6:
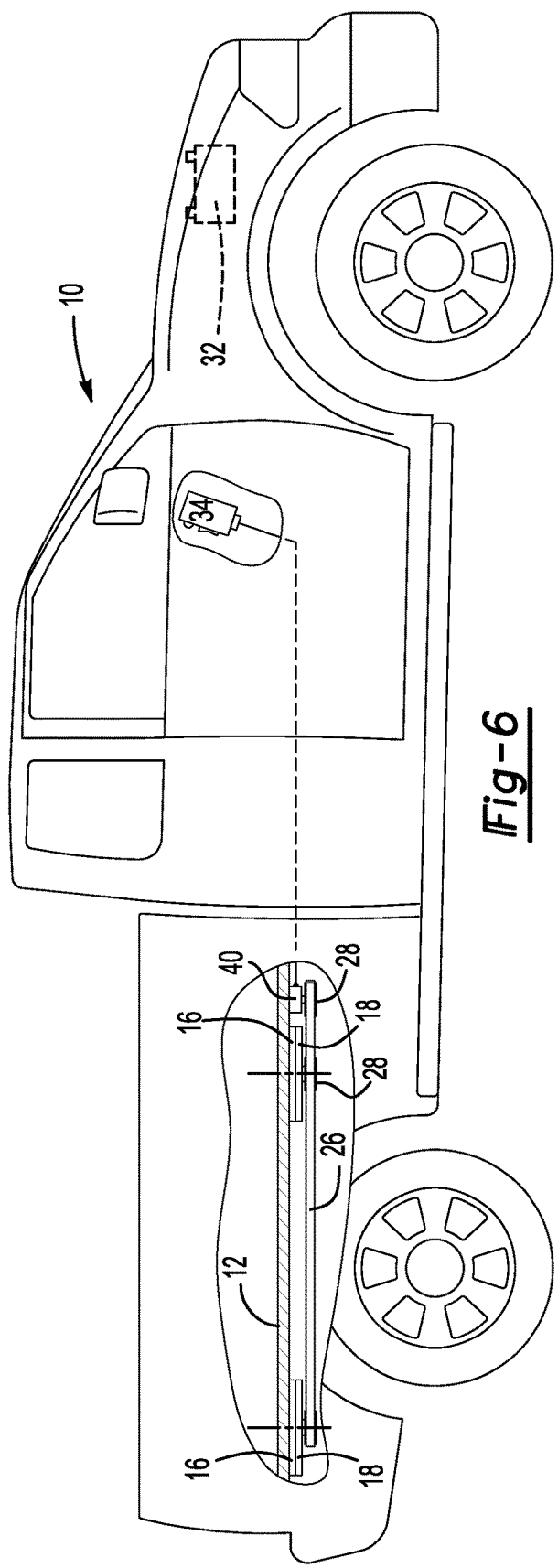
FIG. 6 is a side elevation view partially broken away of the pick-up truck in FIG. 5.

Referring to FIGS. 5 and 6, another alternative embodiment is shown in which a servo motor 40 is used to rotate the second permanent magnets 18. In the embodiment of FIGS. 5 and 6, a power source 32, such as a vehicle battery, is selectively connected by a switch 34 to the servo motor 40. The switch 34 may be an internal switch control of a controller, or may be a manual toggle switch. The switch 34 is accessible within the passenger compartment of the pick-up truck 10. If desired, the switch 34 may be incorporated in a key fob to allow the motor 40 to be remotely operated when it is desired to load or unload objects from the truck bed 12. The motor 40 rotates a driving wheel 28 that engages the flexible drive element 26. The flexible drive element 26 is operable to rotate the driven wheels 24. The driven wheels 24 rotate the second permanent magnet 18 relative to the stationary first permanent magnet 16 to change the strength of the magnetic field used to retain objects on the truck bed 12.

Figure 7:
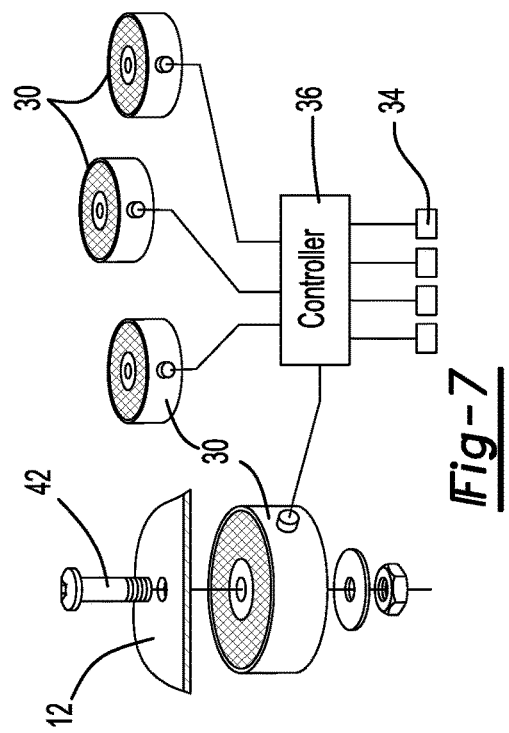
FIG. 7 is a diagrammatic view of an electromagnetic cargo retention system.
Figure 9:
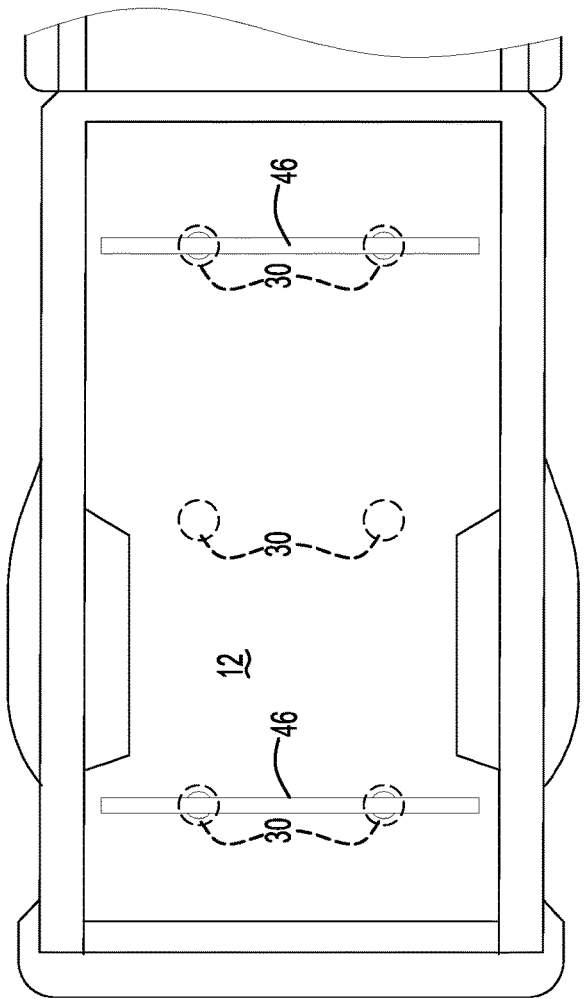
FIG. 9 is a fragmentary top plan view of a pick-up truck showing the truck bed being provided with a plurality of electromagnets with some of the magnets being used to support a removable partition.

Referring to FIG. 7, another alternative embodiment is shown wherein a plurality of electromagnets 30 are connected to a controller 36. The electromagnets 30 may be attached to the truck bed (as shown in FIG. 9) in a spaced relationship inside the truck bed. The controller 36 may receive inputs from switches 34 that may be used to control the individual magnets as a group or individually. The controller 36 is electrically connected to the electromagnets 30 that are secured to the truck bed 12 by fasteners 42 that hold the electromagnets 30 against the truck bed 12.

The electromagnets may be controlled by the switches 34 that may send control signals to the body control module that controls the supply of power to the electromagnets 30 in the truck bed 12. The body control module may integrate the signal with the vehicle speed and steering inputs to adjust the power provided to the electromagnets based upon vehicle dynamics. Power consumption of the electromagnets 30 may be reduced by limiting the power supplied when kinetic forces applied to objects 14 in the truck bed 12 are reduced.

Figure 8:
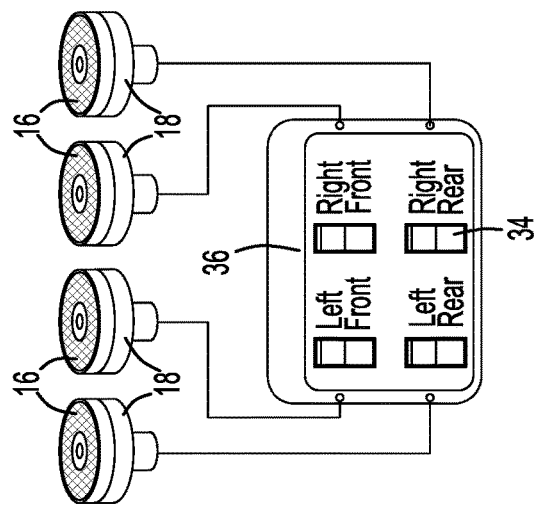
FIG. 8 is a diagrammatic view of a cargo retention system and controller for another embodiment that includes an individual servo motor for each set of paired permanent magnets as described with the embodiment of FIGS. 1-4.

Referring to FIG. 8, another alternative embodiment is shown in which a plurality of servo motors 40 are used to rotate the second permanent magnet 18 relative to a first permanent magnet 16. A plurality of switches 34 provide inputs to a controller 36. The switches 34 and controller 36 may be used to individually control the separate servo motors 40. In the embodiment of FIG. 8, a single servo motor 40 is attached to each of the second permanent magnets.

The servo motor 40 may be attached to the truck bed (as shown in FIG. 9) to provide a plurality of magnetic cargo retention areas in the truck bed 12. The servo motor 40 rotates with the permanent magnets 16 and 18 relative to each other to control the magnetic field acting on the partitions 46. Alternatively, the electromagnets 30 may be used to hold the partitions 46 in place in the truck bed 12. The partitions 46 may take a wide variety of shapes and may extend horizontally in the lateral direction or in the longitudinal direction. Hooks, rings, or other attachment devices may be retained on the truck bed 12 instead of the partitions 46. Other types of attachment devices may be held in place by the electromagnets 30 permanent magnets 16 and 18. For example, a hook, loop or block can be secured to the magnetic area to facilitate tying down any size or shape of cargo. Placing the magnets below the floor of the pick-up truck bed maximizes flexibility and does not consume cargo space within the truck bed.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A cargo retainer for a pick-up truck bed comprising:
   a first permanent magnet creating a first magnetic field applied to objects disposed in the bed; and
   a second permanent magnet creating a second magnetic field, the second permanent magnet being attached to the bed to move relative to the first permanent magnet, wherein the second permanent magnet is moved to change a level of magnetic force applied to objects in the bed.

2. The cargo retainer of claim 1 wherein the first permanent magnet is fixed to the bed and the second permanent magnet is attached to a pin that extends through an opening defined by the first permanent magnet, and wherein the second permanent magnet is rotated relative to the first permanent magnet.

3. The cargo retainer of claim 1 wherein the first and second permanent magnets each have a north pole and a south pole, the second permanent magnet being rotatable from a retention position with the north pole of the second magnet aligned with the north pole of the first magnet to a release position with the north pole of the second magnet aligned with the south pole of the first magnet.

4. The cargo retainer of claim 1 further comprising:
   a handle operatively attached to the second permanent magnet and extending through an opening in the bed, wherein the handle is accessible inside the bed to rotate the second permanent magnet.

5. The cargo retainer of claim 1 further comprising:
   a servo motor operatively attached to the second permanent magnet is selectively actuated to rotate the second permanent magnet.

* * * * *